United States Patent [19]
Hale

[11] Patent Number: 6,057,501
[45] Date of Patent: *May 2, 2000

[54] METHOD AND APPARATUS FOR TEACHING MUSICAL NOTATION TO YOUNG CHILDREN

[76] Inventor: Beverly M. Hale, 2332 Franklin St., Bellingham, Wash. 98225

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/688,519

[22] Filed: Jul. 30, 1996

Related U.S. Application Data

[63] Continuation-in-part of application No. 08/260,777, Jun. 14, 1994, Pat. No. 5,540,132.

[51] Int. Cl.[7] .................................................. G09B 15/00

[52] U.S. Cl. ........................................ 84/470 R; 84/483.2

[58] Field of Search ............................. 84/470 R, 471 R, 84/476, 483.1, 483.2; 434/428, 430, 433

[56] References Cited

U.S. PATENT DOCUMENTS

| | | | |
|---|---|---|---|
| 1,309,915 | 7/1919 | Siegel | 84/470 R |
| 2,236,638 | 4/1941 | Adams | 84/476 |
| 2,315,793 | 4/1943 | Jay | 84/476 |
| 2,447,213 | 8/1948 | Sledge | 84/470 |
| 2,807,183 | 9/1957 | Ney | 84/471 |
| 3,595,121 | 7/1971 | Magers | 84/470 R |
| 3,724,097 | 4/1973 | Schmoyer | 84/478 |
| 3,994,500 | 11/1976 | Schow | 84/470 |
| 4,819,539 | 4/1989 | Searing | 84/476 |

*Primary Examiner*—Robert E. Nappi
*Assistant Examiner*—Shih-yung Hsieh
*Attorney, Agent, or Firm*—Todd N. Hathaway

[57] ABSTRACT

A method for teaching musical notation to children. Each note is associated with a distinctly identifiable color, which is in turn associated with an object which naturally occurs in this color. Each object, in turn, is associated with a cartoon character which prominently incorporates an image of the object. Each character is endowed with a distinctly identifiable personality characteristic which enables the child to utilize the cartoon character in an educational activity. These relationships allow the child to apply relatively sophisticated symbolization techniques which are a part of the child's natural developmental process in order to master the musical notation system.

14 Claims, 5 Drawing Sheets

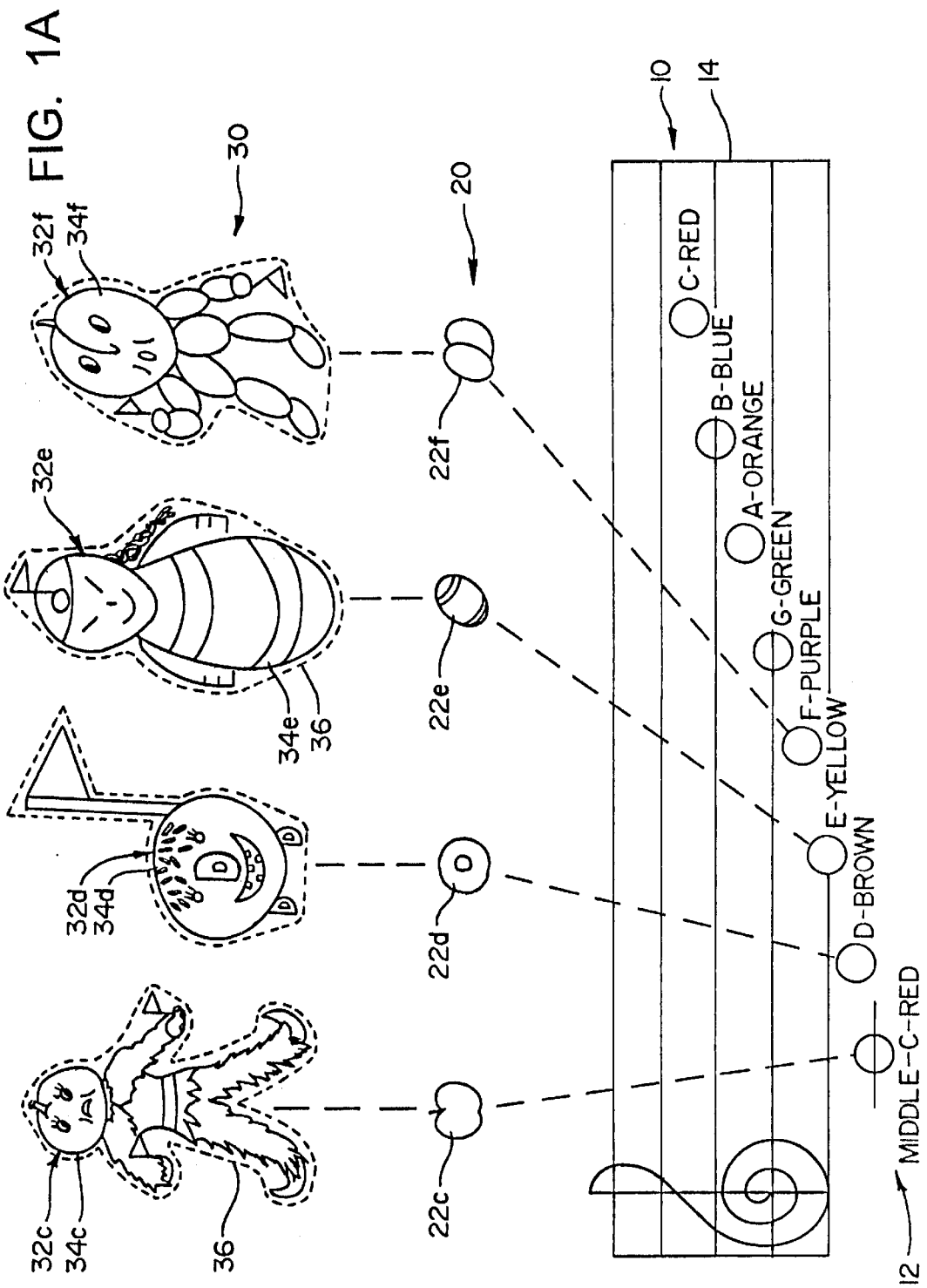

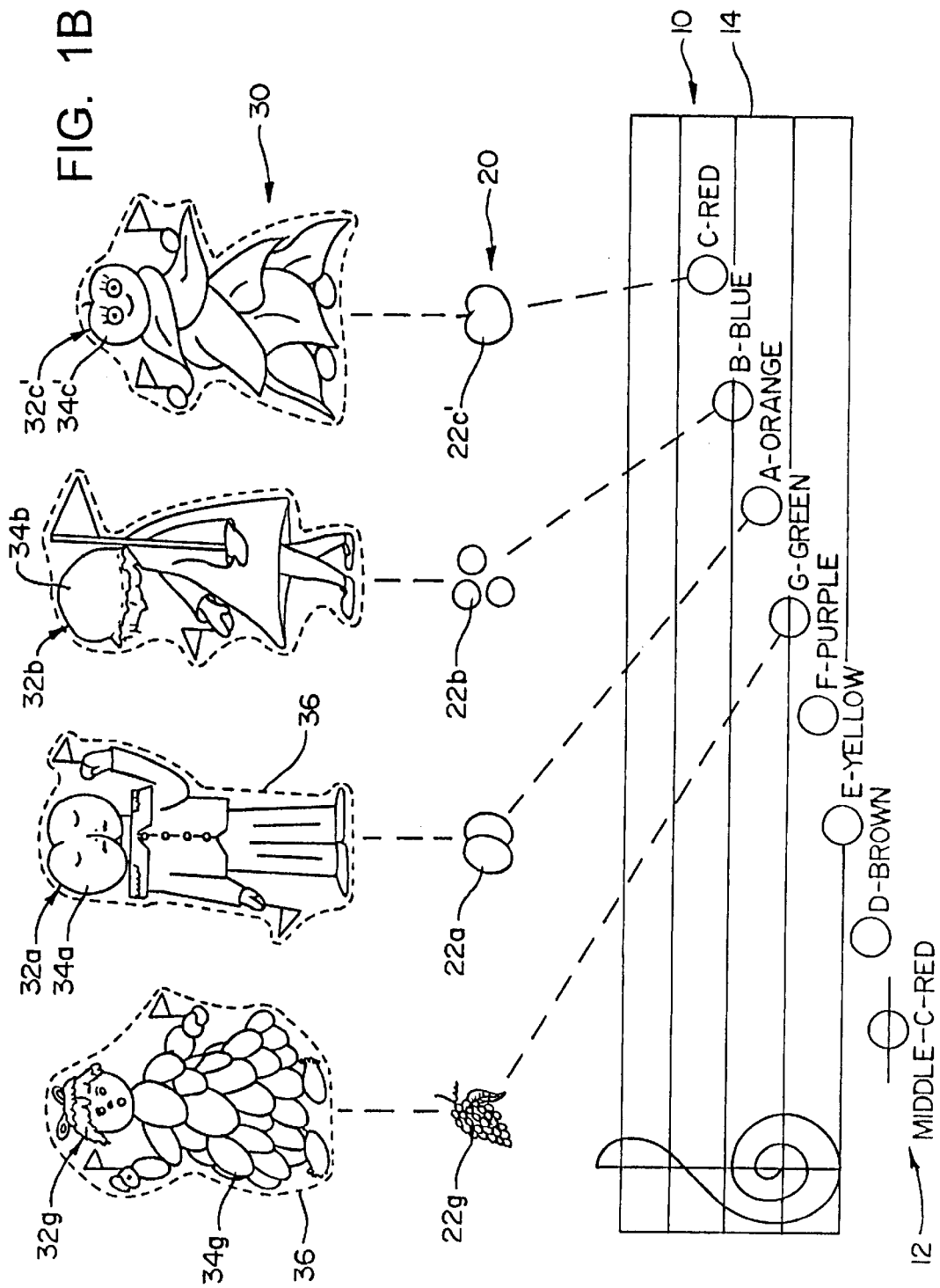

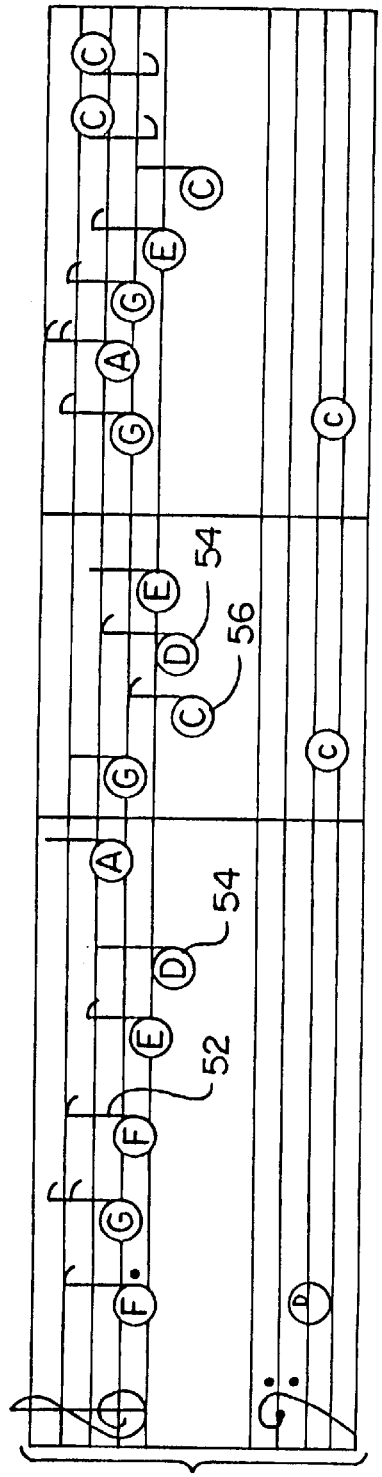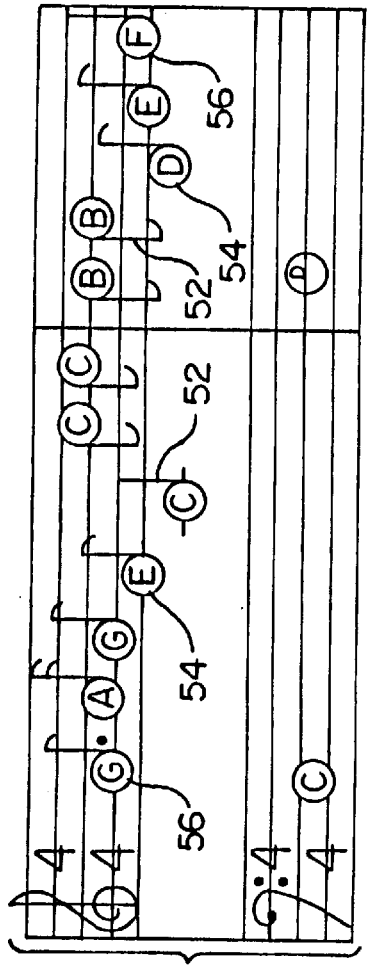

METHOD AND APPARATUS FOR TEACHING MUSICAL NOTATION TO YOUNG CHILDREN

RELATED APPLICATIONS

This application is a continuation-in-part application of U.S. Ser. No. 08/260,777, filed Jun. 16, 1994, now U.S. Pat. No. 5,540,132, entitled "Method and Apparatus for Teaching Musical Notation to Young Children".

BACKGROUND OF THE INVENTION

1. Field of the Invention

The present invention relates to the educational tools and display apparatus, and more particularly, to a method and apparatus for teaching musical notation and auditory perception to young children, by providing a system of symbols endowed with distinctive characteristics which the child can associate individually with each of the musical notes.

2. Background

Many systems and aids have been proposed for teaching the musical scale to young children. A number of these systems have utilized colors and/or colored objects, while others have taken the form of card games. Illustrative examples of earlier approaches include those set forth in the following U.S. patents:

U.S. Pat. No. 4,819,539 (Searing) discloses a system which employs display cases having horizontal dividers which represent the lines on a staff. The cases hold flash cards showing objects having names which begin with letters which correspond with the positions on the scale, i.e., a flash card showing a pair of gloves is provided for the note "G". A cassette tape device generates the noun, the name of the note, and then the sound of the note, after which the student selects another card; the time required to remove all of the cards is clocked by the device.

U.S. Pat. No. 2,807,183 (Ney) discloses a portable dummy keyboard having a frame 56 which displays the musical staves above the keyboard. The frame supports wires on which colored markers representing each of the keys can be mounted.

U.S. Pat. No. 2,447,213 (Sledge) discloses a color code system in which each of the lines on a staff is provided with its own color, i.e. the "G" line is colored blue, and a small blue house is mounted at the end of the line, drawing the analogy to a street. Markers in the shape of animals having names which begin with the appropriate letters (i.e., a goose for "GG", a bear for the note "B", and so forth) are mountable on the display board and are colored to match the appropriate note line. For example, the goose is colored blue (and is also marked with the letter "G"), and the child is taught that the goose lives in the blue house at the end of the blue street. After the child learns the line with which each note is associated, the colored house for that line is moved to the appropriate key on a dummy piano keyboard made up of blocks 12.

U.S. Pat. No. 2,236,638 (Adams) discloses a device comprising a series of interfitting dummy key blocks which are identical in shape to the keys of a piano, but which are organized according to a color arrangement.

U.S. Pat. No. 2,315,793 (Jay) discloses a system which is somewhat similar to that of Sledge, in that each note has associated therewith the image of an animal whose name begins with the letter which represents that note; i.e., a picture of the head of a goat appears with the note "G" on the printed musical score, along with the letter "G" itself. This same symbol is also displayed on the sides of a hollow toy block which houses swinging chimes which emit the sound of the appropriate note when the block is shaken.

The prior art systems described above all employ some form of symbology, by associating colors and/or images with the notes of the musical scale. However, some of these systems (e.g. Searing) are overly complex for use by very young children, while others (e.g. Adams, Ney, and Sledge) are particularly adapted to teaching the use of a piano keyboard, which may or may not be the object of instructing the child.

More fundamentally, none of these earlier systems makes full use of the capabilities which symbolization offers in education of young children. Recently, it has come to be understood that children employ symbology in changing and increasingly complex patterns very early in life. It is now believed that, beginning at about the age of two, children pass through a series of developmental crests that have been termed "waves". As the child enters each wave, the use of symbolization becomes increasingly sophisticated. In particular, as children approach the more advanced stages of symbolization (around three to five years of age), they commonly show an attraction toward what has been referred to as "second-order" symbolization, in other words, a set of symbols or marks that itself refers to a first set of symbols or marks. It is believed that the impulse to create second-order symbol systems is a deep-seated human inclination which emerges with little provocation. The systems described above generally employ symbology in only the most basic forms, and thus do not take advantage of the powerful, higher-order levels of symbolization towards which children in this age group are naturally inclined.

Moreover, the development of "second-order" symbolization skills is valuable in and of itself. Once the child has devised a symbol system that itself refers to other symbol systems, the possibility of embeddedness emerges; complete systems can be systematically absorbed as component parts into ever more powerful systems, as, for example, when multiplication presumes addition, or when algebra presumes arithmetic. Such high-order systems of notation lie at the very center of many scholastic activities, and the capacity to engage readily in such activities is key to the academic success of a child. As will be described below, the present invention not only takes advantage of higher-order symbolization to achieve the immediate goal of instructing the child regarding the notes of the musical scale, but it fosters the early and continued development of such symbolization for the more general benefit of the child.

The preceding section has discussed the importance of higher-order symbolization in general. With respect the present invention, there are additional reasons for exercising the musical abilities of a child by employing a symbolization process. Firstly, it is now believed that what is generally referred to as human intelligence is actually made up of a plurality of distinct but interrelated "intelligences", each of which appears to be somewhat localized in separate regions of the brain, and each of which is susceptible to capture in a symbolic system. In particular, some specialists have theorized that there are at least seven identifiable "intelligences", namely (i) use of the body to solve problems or to make things, (ii) an understanding of other individuals, (iii) an understanding of ourselves, (iv) language, (v) logical-mathematical analysis, (vi) spatial representation, and (with respect to the present invention in particular) (vii) musical thinking (e.g., see *The Unschooled Mind*, Howard Gardner, Basic Books, Inc. (1991); *Frames of Mind, the Theory of Multiple Intelligences*, Howard Gardner, Basic Books, Inc. (1983)).

Although the first six "intelligences" listed above are reasonably well addressed by conventional education programs, there is relatively little emphasis on musical thinking, with the result that this particular intelligence tends to be widely undeveloped in modern Western society. In a broader context, musical intelligence is one of those intelligences which make up what is commonly referred to (from it location) as "right brain" thought; it has become recognized that, although traditional academic programs stress the development of "left brain" skills, it is in fact critical for both types of thought to become fully developed if the individual is to achieve their full potential.

Moreover, it is believed that, amongst all of the identifiable "intelligences", musical thinking is one of the first to be enabled in the development of a child (see references cited above). Therefore, to the extent that this particular intelligence is successfully developed as early as possible, the symbolization and other skills which the child thus acquires enable the other intelligences to be developed at an accelerated rate.

Therefore, there exists a need for a system for teaching musical notes and tones to young children which employs and takes full advantage of the natural ability and tendency of such children to engage in relatively high-order symbolization. Furthermore, there is a need for such a system which develops the child's musical ability or "intelligence" at a relatively early age, so as to enable the child to retain and utilize this ability in related developmental areas.

SUMMARY OF THE INVENTION

The present invention has solved the problems cited above, and is a method for teaching musical notation to young children. Broadly, this comprises the steps of: (a) placing each musical note alongside a distinctly identifiable color, (b) placing each distinctly identifiable color alongside an object which is selected from a group of objects with which the child has previous experience and which has a color exhibited in its natural state which matches the distinctly identifiable color, and (c) placing each object alongside a cartoon character which is formed to prominently incorporate an image of the selected object.

The method may further comprise the step of forming the cartoon character as an article having a first display surface predominantly showing the distinctly identifiable color thereon. This step may further comprise forming the cartoon character as an article having a second display surface predominantly showing a black color thereon. With the article having the two display surfaces, the step of placing the object alongside the cartoon character may further comprise placing the object alongside the article forming the cartoon character with the first display surface visible so as to predominantly show the distinctly identifiable color, and then displaying the second surface of the article forming the cartoon character so as to predominantly show the black color, so as to provide a visual correlation between the cartoon character and the musical note on a black and white musical score.

The step of forming the cartoon character as an article having first and second display surfaces may comprise forming the article as a two-sided figure having an outline in the shape of the cartoon character, so that the first and second display surfaces can be alternatively shown by flipping the figure over while the outline remains substantially the same. Alternatively, the step of forming the cartoon character as an article having first and second display surfaces may comprise forming the article with an outer fabric layer predominantly showing the identifiable color thereon, and an inner fabric layer predominantly showing the black color thereon, the inner and outer fabric layers being joined to form a tubular fabric structure having an outline in the shape of the cartoon character, and being configured to be selectively turned inside out so as to alternately expose the inner and outer fabric layers while the outline remains substantially the same.

The method may also include the step of generating at least one musical tone which corresponds to the musical note, in conjunction with displaying the cartoon character to a child. The step of generating the at least one musical tone may comprise playing a recorded script which incorporates the musical tone therein. The recorded script may be created by providing a written script which is to be associated with the cartoon character, and dictating the written script into a recording apparatus so as to form the recorded script. This may further comprise the step of verbally interjecting a child's name at selected points in the script so that the recorded script forms a simulated dialog between the cartoon character and the child. Alternatively, a prerecorded script may be provided having blank portions at selected points, and the child's name may be verbally interjected into the blank portions using a recording apparatus.

BRIEF DESCRIPTION OF THE DRAWINGS

FIG. 1A is a diagrammatical view illustrating the sequential stages of symbolization which are employed by the present invention, first linking a musical note alphabetically and by color to one of a particular series of objects which are in the child's realm of experience, and then alphabetically and by color and shape, and optionally by tone, to a cartoon character which embodies selected personality characteristics which the child is able to employ in high-level symbolization such as storytelling;

FIG. 1B is a diagrammatical view similar to FIG. 1A showing exemplary objects and cartoon characters which are associated with the next four notes in the diatonic scale;

FIG. 3 is a diagrammatical view of a portion of a musical score showing the manner in which a color code legend is associated with the score and the notes are formed so that the child can color these in with appropriate colors selected from the legend.

DETAILED DESCRIPTION a. Overview

Figure 2:
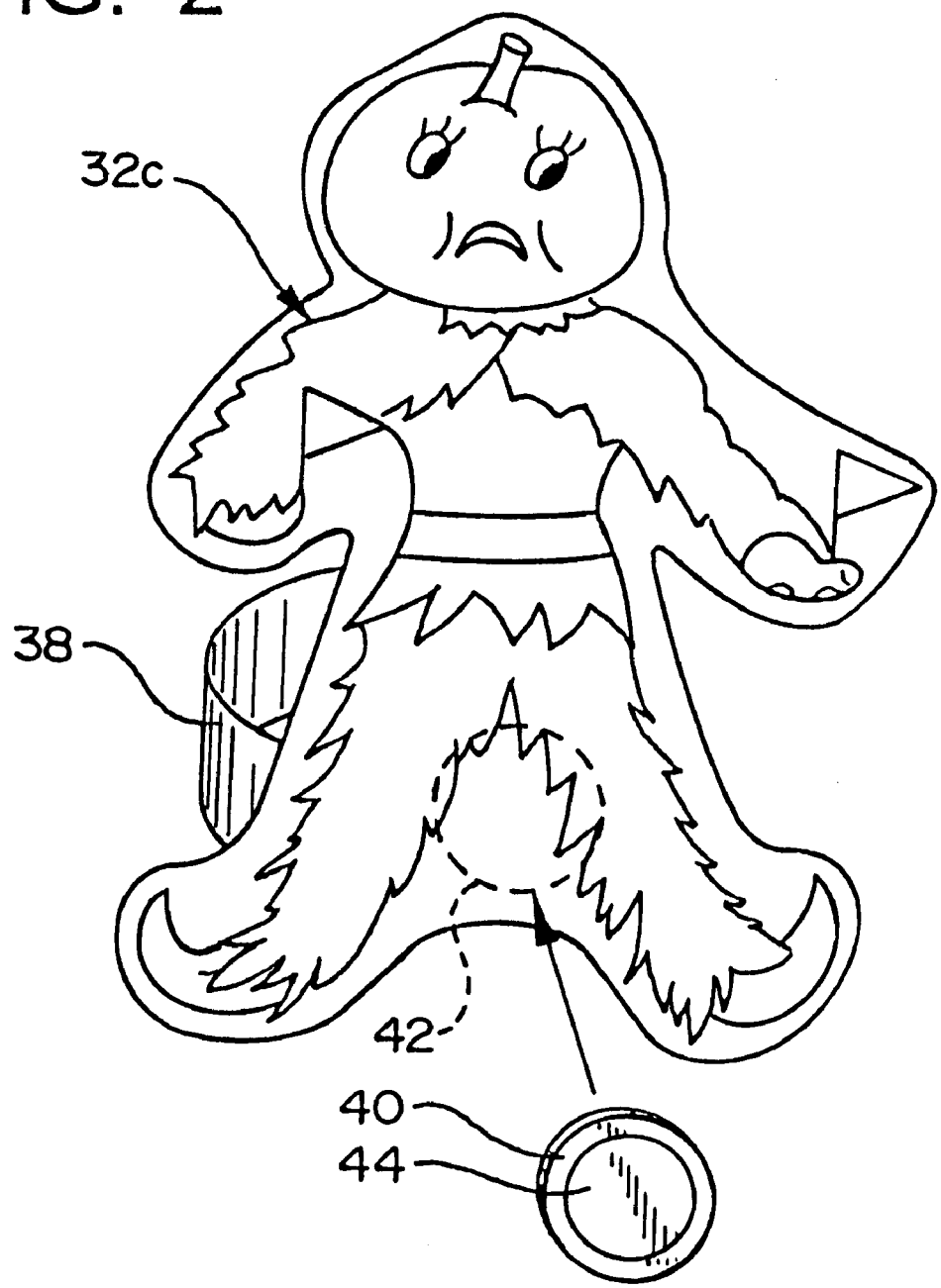
FIG. 2 is a prospective view of a finger puppet embodying one of the cartoon characters of FIGS. 1A-1B which are associated with individual notes, so that the child can employ the puppet in storytelling, puppet shows, and similar activities, the puppet optionally being provided with an electronic device for emitting a tone such as middle-C, which can be activated by pressure between the child's fingers.

The present invention provides a developmentally appropriate music readiness program which facilitates the instruction of musical notation to young children, by creating a system which employs the second-order symbolization which is a natural part of the child's development. In short, the system of second-order symbolization uses symbols or notations that themselves refer to other symbols, in this case the notes of the musical scale and other music symbols.

In particular, the system of symbolization which is employed by the present invention involves the following steps or stages:

(1) A separate and distinct color is associated with each note of the scale.

(2) Each note is then associated with one of the selected series of objects which is within the realm of the child's experience, on the basis of
   (a) the natural color of the object, and
   (b) the first letter of the noun name.

The series is preferably selected on the basis of a shared sensory stimulus by which the objects are ordinarily perceived and characterized by the child; i.e., taste, smell, touch, and so forth.

(3) Each inanimate object representing a note of the musical scale is then associated with a cartoon character by
   (a) color,
   (b) the first letter of the name, and
   (c) shape.

Using facial characteristics, name structure and other features, each cartoon character is endowed with distinctive personality traits which distinguish it from the others in the series.

(4) Each cartoon character is provided in a form which the child and/or teacher can manipulate manually so as to encourage educational instruction, storytelling, puppet plays, individual play, and so forth, so that the symbolization is fully realized.

(5) Optionally, each manually operable character may be provided with a device for emitting a tone, sentence or song, in a tone which corresponds to that of the note which the character represents, thereby reinforcing the association with that note and also improving the child's auditory discrimination.

Accordingly, the present invention provides a highly effective system for teaching musical notation to very young children, in a manner which is developmentally appropriate at this stage of their life, using concrete, real world experiences with which the children can understand, rather than the highly abstract concepts which have traditionally been employed in music instruction. In a larger sense, however, the present invention provides a tool which parents and teachers can use to fill an existing gap in the socialization of children, by motivating and stimulating their interest in music from infancy through pre-school and elementary school. The system of the present invention is particularly well adapted to use in conjunction with a "learning center" approach to education, in which there is an activity area having various educational tools which the children can use for self-instruction on a periodic basis.

Furthermore, the present invention lends itself strongly to instruction in "patterning". As is known to those skilled in the relevant art, such instruction is designed to teach children the concept of "patterns", typically using colored beads, unifix cubes, and other objects or structures arranged in repeating color sequences. By relating the patterns to the colored notes and characters which it provides, the present invention permits the teacher to employ musical beats, notes, tones, songs, octaves, and other musical features as both tools and objects of pattern instruction. Still further, the colors, characters, and "dispositions" which are used in the present invention provide vehicles which permit the musical instruction to be related to other curricula, such as social studies, mathematics, reading, physical education, and so on. For example, the characters and system of the present invention can be used by a class to create songs relating to a culture or region which is being studied, based on the timing of an existing song or creating their own (or perhaps using a single chant arrangement with young children), or the related subject may be made a part of the character's dialog or other verbal or visual presentation, as will be described in greater detail below.

b. Exemplary Embodiments

FIGS. 1A-1B illustrate a system in accordance with the present invention in which the basis for the primary symbolization is provided by a series of fruit and other relatively compact edible objects which are both familiar to and readily distinguishable by the child, on the basis of both color and taste.

Accordingly, a first symbolization level, as represented at 10 in FIG. 1A, involves associating the notes of the scale with individual, easily distinguished colors. The child is thus presented with the series of notes 12 located in the conventional positions on a simplified musical staff 14. The notes are preferably printed as simple "whole" notes (i.e., as simple open circles, sometimes shaded or "greyed") so as to provide an area which can be colored in by the child, although the coloring can be performed on a conventionally printed score having black and white notes.

In the embodiment which is illustrated, the colors which are associated with the notes of the scale are as follows: "C"—red, "D"—brown, "E"—yellow, "F"—purple, "G"—green, "A"—orange, "B"—blue. It will be understood that any series of easily distinguished colors can be used in addition to or in place of the foregoing, however the colors provided in this example have the very real advantage of corresponding to the colors which are provided in a child's basic crayon set.

The second symbolization level is indicated by the numeral 20 in FIG. 1A, which involves associating a distinctive edible object 22 with each of the notes of the scale, on the basis of the natural color of the object and also the first letter of its name. For example, the note middle "C", which was previously colored red, is associated with the image of a crab apple 22c; the child actually associates apples with the color red, and crab apples in particular with a biting, sour taste, the latter being useful for subsequently establishing the personality of the associated cartoon character. Continuing up the scale, the note "D" which was colored brown, is associated with a brown donut 22d, the note "E" is associated with a yellow Easter egg 22e, the note "E" with a purple fruit 22f, the note "G" with green grapes 22g (see FIG. 1B), the note "A" with orange-colored apricots 22a, the note "B" with blue blueberries 22b and, finally, upper "C" with a red cherry 22c', the sweet taste of the latter naturally contrasting with the sour of crab apples to distinguish this from middle "C". Thus, the noun name for each of the symbols 22c–22c' begins with the same letter in the alphabet as the letter designation given to the associated musical note; moreover, the association is strengthened by that fact that the child will generally know at a very early stage that the colors of these objects will naturally correspond to those which were used in the color code for the notes.

As was noted above, the exemplary symbols 22 which are employed for the second symbolization level 20 in the illustrated embodiment are all edible and have distinctive flavors. Hence, these bring the child's sense of taste into play, in addition to the sense of sight which was previously engaged by the color associations. In fact, it may be preferred in some embodiments to have the child taste a sample of each of the edible objects as the association is made, therefore reinforcing the recognition of the distinctive character of each object in the set. Other series of symbols may be associated with the musical notes at this stage, in addition to or in place of the edible objects shown, but it is generally preferable that whatever set is selected, it bring the new sense into play, in addition to sight and sound (i.e., phonetics). It should also be noted that it is preferable to employ objects which have the advantage of being shaped so as to be easily drawn by the child, as is the case with the examples 22c–22c' shown in FIGS. 1A-1B.

The final level of symbolization, as indicated by numeral 30 in FIGS. 1A-1B, involves establishing the connection between the object representing each musical note and the corresponding cartoon character. For example, FIG. 1A shows the cartoon character "Crabby Crab apple" 32c associated with the crab apple 22c which in turn represents the note middle "C". This link is established by the common color of the character, the object and note (e.g., the color red), and this may be achieved by having the child color the character with the appropriate crayon.

In addition to the use of a common color, the link between the cartoon character 32 and its associated inanimate object 22 is established by using the shape of the latter to form a significant portion of the body or other characteristic of the cartoon character. For example, it will be observed that the head of the character Crabby Crab apple 32c is formed in the shape of a crab apple 34c which corresponds in shape to the crab apple 22c. Similarly, the bodies of the other cartoon characters 32d–32c' incorporate their respective objects 22d–22c' as a prominent portion thereof. Moreover, each cartoon character preferably displays the letter of the note with which it is associated, and is depicted as carrying or embodying the image of the musical note itself to reinforce this connection.

Therefore, the shared color, shape, and first letter of the name makes it very easy for the child to associate each cartoon character with its respective object 22, and therefore with the note of the scale which each object represents.

As noted above, it is important that each of the cartoon characters 32c–32c' be endowed with personality traits which are easily distinguishable from those of the other characters. Moreover, it is preferable to somehow tie this character in with the distinguishing sensory characteristic of the object 22 which is linked to the musical note. For example, in FIG. 1A, the facial expression and other visible features of the character Crabby Crab apple are selected to endow that character with a sour disposition which is easily associated by the child with the sharp, sour taste of the crab apple 22c. So as to provide a contrast, the note upper "C" is represented by the cartoon character Cheerful Cherry, whose pleasant disposition corresponds to the sweet, pleasant flavor which the child associates with cherries 22c'. Although the link between the personality of the cartoon character and the flavor of its associated fruit or other edible object 22 may not always be as easy to grasp as in these two examples, it is nevertheless generally possible to craft each character to have a personality which can be linked (with a little imagination) to an emotional response or reaction which the child can reasonably be expected to have to the flavor or some other characteristic of the linking object 22.

Having provided the cartoon characters 32 with distinct personalities, the child and/or teacher is then able to use these characters in both educational introduction/instruction and relatively high level, secondorder symbolization, in the form of storytelling, games, puppet shows, individual play, and similar activities. When working with printed materials, it is therefore preferable that each of the cartoon character images be provided with a suitable border, as indicated by dotted lines 36, so that the child can cut the character out and use it in puppet shows or other activities. In particular, if the cartoon FIG. 32 is cut from paper, as is illustrated in FIG. 2, a small paper loop 38 or similar structure may be attached to the back surface of the character to receive one or more of the child's fingers so as to enable the child to use the character as a finger puppet in puppet shows and other animated storytelling. In addition to the paper structure which is illustrated, the cartoon character may be formed of any suitable material, such as cloth or plastic, for example, and may be formed as any other kind of puppet, such as a hand or paper bag puppet mitten, or as a doll, figurine, nesting doll, toy or any other similar device which is suitable for manipulation and animation by a child and/or teacher.

Moreover, the puppet character is preferably provided with a tonal device 40. Suitably, this may be a battery powered electronic device which emits a tone, sentence, or song in response to the application of finger pressure, in a tone which corresponds to that of the musical note with which the character is associated; such devices are commonly available from a number of sources, including for example, Darice Inc. of Strongsville, Ohio. The tonal button 40, may suitably be mounted in the area indicated by the dotted line image of 42 on the front surface of the paper opposite the finger loop or band 38, with the pressure-sensitive switch portion 44 of the device facing outwardly. Thus, the person can selectively activate the tonal device by pressing it between his fingers, with his thumb on the switch portion 44, as he moves the puppet about to engage in a dialog or other introductory or storytelling activity. Thus, as the tonal device is activated (which may serve to provide "speech" for the cartoon character), the sound of the note which is associated with this character is reinforced upon the mind of the child. Moreover, this activity exercises and enhances the child's auditory perception and discrimination abilities.

In addition to or in place of the tonal button described above, the present invention may also include a cassette tape player or other device for generating a voice or "speech" for the certain character. For example, prerecorded cassette tapes (or CDs, records, or the like) may be provided which the teacher can play to represent the "voice" of the puppet during interaction with the child or class. Advantageously, the recorded voice may have a tone which matches that of the note with which the character is associated, or there may be a background or intermittent tone produced (for example, by a piano key, tuning fork or electronically) which accompanies the recorded speech. Furthermore, the prerecorded tape may have a series of blank portions into which the child's name can be recorded by the teacher, with, for example, a tone preceding each of the blank portions to indicate when the child's name should be inserted on the recording.

Thus, when the tape is played, the character can give the impression of talking to the child so as to stimulate interactive learning. Moreover, the tape-recorded script may be constructed to include a series of questions or other statements eliciting responses from the child, so as to generate an active dialog between the child and "character", again with the object of generating interest in the lesson.

Also, in some embodiments, a script may be provided to the teacher in place of the prerecorded cassettes. The teacher can then dictate the script into a tape recorder, inserting the names of the child or children where indicated by the script (e.g., in questions or other verbal prompts), as well as other information which is of interest to the particular child or class. Preferably, the nature of the script or prerecorded conversation should be consistent with the disposition associated with each particular cartoon character, e.g., Crabby Crab Apple should be irritable, Cheerful Cherry should be pleasant in demeanor, and so on; for example, Crabby Crab Apple can be presented as having grumpy attitude due to just having woken up from a nap.

The next step in the practice of the present invention is to apply the knowledge which the child has acquired through the symbolization process described above in the reading of an actual musical score 50. The musical notes 52 are provided with circular portions 54 which contain the letter designation 56 of each note. The circular portion of each note (which may be shaded or "greyed" to denote a black note) is intended to be colored in by the child using a crayon, a legend 58 showing the object images and colors which are associated with each note in the system being provided to refresh the child's memory.

Having thus filled in the colors on the notes, the child will ordinarily be able to recall, from having been motivated and socialized by playing with the puppets incorporating the tonal devices, the actual musical tone which each note represents. The child will then be able to sing or otherwise play the melody from the score 50, including any words (not shown) which may be provided.

Although the present invention has been largely described herein with reference to various manual steps, such as the manual coloring of the notes, manipulation of the puppets, and so on, it will be understood that one or more of these steps may be performed using an electronic computer provided with suitable software. For example, the images of the characters can be generated "on screen" by the computer, and the coloring of the notes can be done using a simple graphics program, such as a typical "paintbrush" program. A computer audio system can also be used to generate the musical tones and/or verbal scripts which are associated with the notes and characters. Moreover, the computer program can be configured to provide a basic composing function, i.e., the computer can generate a series of tones representing a tune based on the child's placement of notes on the computer-generated image of a musical staff. As noted elsewhere herein, this offers advanced students the opportunity to exercise basic composition skills and personal creativity. It should also be noted that developing computer programs to perform the operations described above is well within the abilities of those having an ordinary level of skill in the computer programming art. Moreover, the system of the present invention may incorporate or be used with existing programs which can create scores with colored notes.

If it is desired to instruct the child in the use of the piano keyboard or other instrument, the following additional steps may be employed. Firstly, prior to the step of introducing the child to the materials described above, colored markers, preferably adhesive plastic or paper letters corresponding to the notes of the scale, are placed on the keys in accordance with the predetermined color pattern; for example, in the embodiment which has been described above, a red letter "C" would be placed on the "C" key, a brown letter "D" on the "D" key, and so for this is done, the teacher can strike each key, introducing the child to the concept that the object will be for the child to be able to produce these tones in the desired manner.

Then, following completion of the association, symbolization, and other steps described above, or possibly simultaneously therewith, the teacher can return to the keyboard and again strike each key, pointing out the color and making the association with the appropriate cartoon character; for example, the teacher may strike the red "C" key and ask the child: "Is this the sound Crabby Crab apple makes?", drawing the connection not only with the color of the character, but with the tone which it emits as well. The association is further reinforced by the use of the letter itself on the key, remembering that (as described above) it is preferable for the cartoon character to be depicted as carrying or otherwise incorporating the letter of the note which it represents.

Using this method, it has been found that children very quickly come to associate the keys with the various cartoon characters and their respective colors. As a result, the children are not only able to play the scores which they have colored in (as described above), but can in fact engage in very basic composition, by coloring notes where they have come to recognize they should be, and then using the keys having the appropriate color. Ultimately, with further practice, the child becomes able to read and play an ordinary printed (i.e., black-and-white) score without making separate reference to either the color code or the cartoon characters.

Figure 4A:
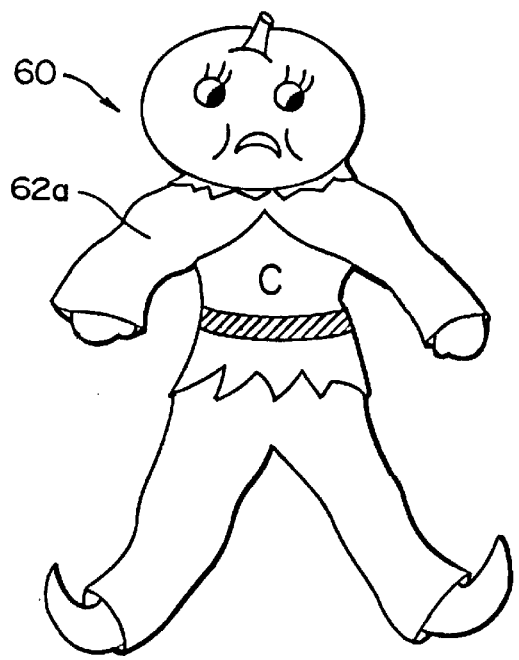
FIG. 4A is an elevational view of a doll embodying a cartoon character representing a musical note in accordance with the method of present invention, showing a first side of the doll having as its predominantly color which is associated with the particular character and particular musical note which is represented by the character.
Figure 4B:
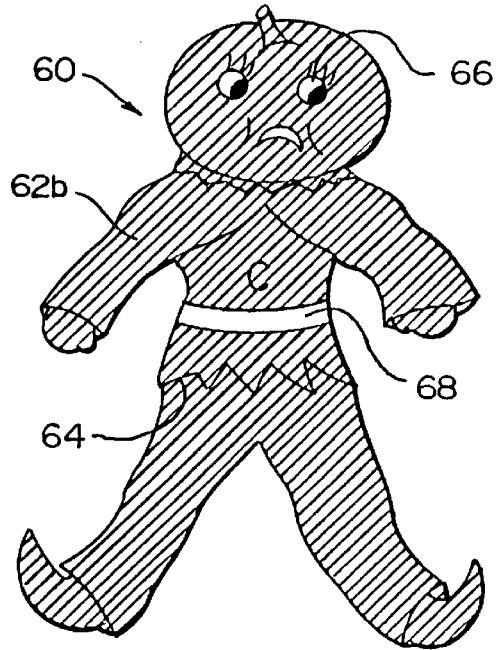
FIG. 4B is a second elevational view of the doll of FIG. 4A, showing a reverse side thereof which has a black as its predominant color for association of the character and musical note which is represented thereby with the black and white note on a conventional printed musical score.
Figure 5:
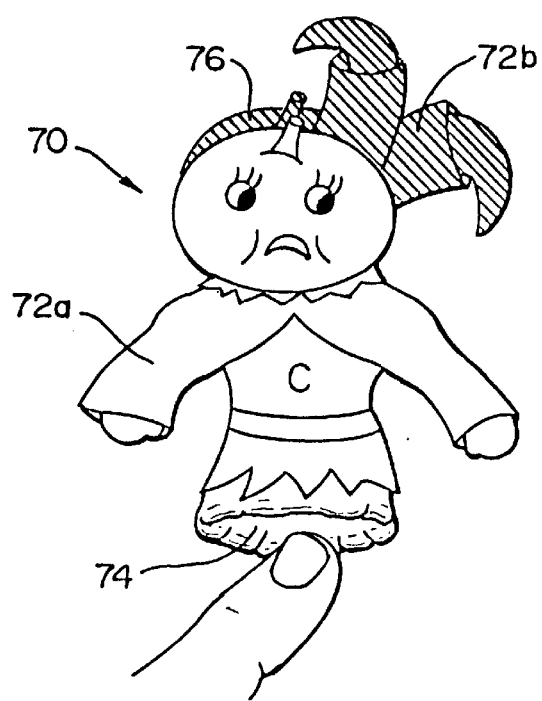
FIG. 5 shows a puppet figure, similar to the doll shown in FIGS. 4A-4B, but in which the change between colors is achieved by pulling the fabric puppet inside-out.

As is shown in FIGS. 4-5, the cartoon characters of the present invention can also be configured to assist the child in making the transition from the colored notes described above to ordinary black and white scores. In each case, the puppet, doll, or other figure is configured as demonstration article to be able to change the dominant color of its display from red, brown, yellow, purple, etc. to black, while retaining the same overall shape of the character with which each color has become associated. For example, FIG. 4A shows the first side of a puppet or doll 60 having the shape of the character "Crabby Crab Apple". In the exemplary system described above, this character represents the note "C" and is associated with the color red. Accordingly, the first side 62a of the doll 60 is red in color, so that this can be used in the first phase of instruction. Then, upon the child reaching a sufficient proficiency with the color-coded system, the teacher flips the puppet over so as to display the opposite side 62b; as can be seen, this is substantially all black in color, but the outline (being the same as that of the front side 62a) is instantly recognizable by the child as being that of the same character, e.g., "Crabby Crab Apple". Certain surface features of the reverse side 62b, such as stitching 64 and eyes 66 are preferably raised or formed in an at least slightly contrasting color, so as to help the child to recognize the character. Furthermore, some feature or features of the characters, such as belt 68 in FIG. 4B, may be formed in the same color as the opposite side (e.g., in the color red in the example which is shown in FIGS. 4A-4B) in order to help the child maintain continuity between the two images, so long as black is plainly the dominant color of the second side 62b.

FIG. 5, in turn, shows a puppet FIG. 70 having a structure such that the color change to black is performed by turning the fabric figure inside-out. In the example which is illustrated (in which the character is again "Crabby Crab Apple"), the outside fabric surface 72a is formed in the color (e.g., red) which is associated with the character. The inside surface 72b, in turn, is formed of black fabric. To turn the character inside-out, so as to change its color to black, the legs of the figure are pushed up through the interior of the puppet, as indicated at 74, and out through an opening 76 in the head area, so that the fabric sleeve of the puppet structure is reversed to expose the predominantly black inside surface 72b. The puppet can be changed back to the red color by reversing the above steps. Again, because the outline of the figure remains essentially the same in both configurations, the puppet retains the recognizable shape of the cartoon character which it represents.

The reversible puppet and doll figures described above make it possible to use the same structure to represent its cartoon character both in color and in black. It will be understood, however, that in some embodiments there may simply be two separate puppets or dolls for each character, one being red and the other being black, although this may be less economical and a lack of the visual interest and continuity generated when the figures described above flip over or turn inside-out to make the color transition. In any event, the purpose of the change from color to black is to show that each cartoon character, which is the symbol for the colored note, also represents the corresponding black note on a traditional black and white score.

As was noted above, the system of the present invention in its preferred embodiment provides a method of instruction which is developmentally appropriate for normal children about 2–5 years old; in other words, the system takes advantage of and exercises the faculties which children usually begin to develop at this age. It should be recognized, however, that the system of the present invention represents a valuable instructional tool which can be used with both younger, developmentally advanced children and older, developmentally impaired persons as well.

Moreover, some or all of the elements described above can be adapted for use by infants, as in the form of mobiles, cloth toys, and other articles which can be used while the child is still in the crib. None of the known prior devices or systems has been adaptable for use by infants, even though it is now understood that socialization of the child begins very early in infancy. The present invention thus fills a gap in the known spectrum of instructional aids for use with infants and very young children, permitting the early socialization of the child in the area of music, in addition to the numerical and alphabetical skills which have traditionally been the focus of early childhood instruction; music can thus be efficiently integrated into curricula on the same level as other academic skills, without having to be dealt with as a separate and subordinate area of instruction. It is also important to note that the various exercises involved in the practice of the system of the present invention, as described above, intentionally involve and help develop virtually all of the child's basic skills: hand-eye coordination, language development and vocabulary (e.g., in storytelling), writing and reading skills, and so forth.

It will be recognized that the system of the present invention is applicable to the instruction of all forms of musical notation, including, for example, the treble and base clefs (to be associated with relatively higher and lower tones, for example, as opposed to the tone of any particular note), half-, quarter- and eighth-notes, etc., "families" of notes (e.g., high-, middle-, and low-"C") which may be represented by groups of cartoon characters having some shared characteristic or feature, and so forth. As another example, the sharps and flats, depending on the key signature, may be presented as characters having some familial or other relationship with the primary notes with which they are associated, such as distinct first and second (e.g., tall and short) children of the character which represents the primary note.

Having described the present invention in its preferred embodiment, it should be understood that numerous changes and modifications may be made without departing from the spirit thereof. For example, the system of the present invention and/or the cartoon characters may be used in various forms of game play. Moreover, the cartoon characters and linking objects may be displayed on toys and other articles which are commonly used by children or teachers, including the following examples: crib toys, mobiles, cups and quilts incorporating tonal devices, puzzles, fabric designs, pins, buttons, candy, color forms, wall designs, cookie cutters, play dough forms, night lights, stickers, lamps, coloring books, and so forth, as well as in or in association with storybooks, textbooks, skill sheets, poems, video/audio cassettes, records, plays, television scripts, video games, and computer programs/games. Therefore, it is to be understood that the present invention is not to be limited except as by the appended claims.

What is claimed is:

1. A method for teaching a set of musical notes to a child, said method comprising the steps of:

providing a set of physical objects, each said object in said set of objects being characterized by a different color;

matching each musical note i n said set of notes with a selected one of said different colors of said objects in said set of objects;

forming a set of fanciful figures, each said figure in said set of figures prominently incorporating an image of a selected one of said physical objects in said set of objects; and matching each note in said set of notes with that figure in said set of figures which incorporates an image of that object in said set of objects which is characterized by that color with which that note has been matched.

2. The method of claim 1, wherein the step of matching each said note with a figure further comprises:

matching each object with said first display surface of that demonstration article which predominantly shows said color of that object thereon.

3. The method of claim 2, further comprising the step of:

displaying said second surface of each said demonstration article so as to predominantly show said black color thereon, so as to provide a visual correlation between said figure thereon and a corresponding musical note on a black-and-white musical score.

4. The method of claim 3, wherein the step of forming said figure as a demonstration article having first and second display surfaces comprises:

forming said demonstration article as a two-sided article having an outline in the shape of said fanciful figure, so that said first and second surfaces can be displayed alternately by flipping said figure over, while said outline remains substantially the same in both positions.

5. The method of claim 3, wherein the step of forming said figure as an article having first and second display surfaces comprises:

forming said article of an outer fabric layer predominantly showing said color of said object thereon and an inner fabric layer predominantly showing said black color thereon, said inner and outer fabric layers being joined to form a tubular fabric structure which is selectively eversible so as to alternately expose said inner and outer fabric layers while retaining said outline in the shape of said fanciful figure.

6. The method of claim 1, further comprising the step of:

forming a visual image of said figure which predominantly shows said color of said selected object thereon.

7. The method of claim 6, wherein the step of matching said notes with said figures further comprises:

matching said selected object with said image of said figure which predominantly shows said color of said selected object thereon.

8. The method of claim 6, further comprising the step of:

changing the color of said visual image of said figure so as to predominantly show a black color thereon, so as to provide a visual correlation between said figure and a corresponding note on a black-and-white musical score.

9. The method of claim 1, further comprising the step of:

generating at least one musical tone which corresponds to said musical note, in conjunction with displaying said figure to said child.

10. The method of claim 9, wherein the step of generating at least one musical tone comprises:

playing back a recorded script which incorporates said musical tone therein.

11. The method of claim 10, further comprising the step of:

providing a recorded script which is associated with said figure.

12. The method of claim 11, wherein the step of providing said recorded script comprises:

providing a prerecorded script having blank portions at selected points therein; and verbally interjecting a child's name into said blank portions in said prerecorded script using a recording apparatus, so that said recorded script forms a simulated dialog between said fanciful figure and a child having said name.

13. The method of claim 11, wherein the step of providing said recorded script comprises:

providing a written script which is associated with said figure; and dictating said written script into a recording apparatus so as to form said recorded script.

14. The method of claim 13, wherein the step of providing said recorded script further comprises:

verbally interjecting a child's name at selected points in said written script so said recorded script forms a simulated dialog between said fanciful figure and a child having said name.

* * * * *